(12) United States Patent
Varkey et al.

(10) Patent No.: US 9,201,207 B2
(45) Date of Patent: Dec. 1, 2015

(54) PACKAGING FOR ENCASING AN OPTICAL FIBER IN A CABLE

(75) Inventors: Joseph Varkey, Sugar Land, TX (US); Garud Sridhar, Singapore (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 293 days.

(21) Appl. No.: 12/623,304

(22) Filed: Nov. 20, 2009

(65) Prior Publication Data

US 2010/0116510 A1 May 13, 2010

Related U.S. Application Data

(63) Continuation-in-part of application No. 11/461,943, filed on Aug. 2, 2006, now abandoned.

(51) Int. Cl.
*G02B 6/44* (2006.01)
*E21B 47/12* (2012.01)

(52) U.S. Cl.
CPC ............ *G02B 6/4488* (2013.01); *E21B 47/123* (2013.01); *G02B 6/4416* (2013.01); *G02B 6/4492* (2013.01)

(58) Field of Classification Search
CPC .. G02B 6/4416; G02B 6/4427; G02B 6/4486; G02B 6/4488
See application file for complete search history.

(56) References Cited

U.S. PATENT DOCUMENTS

| | | | |
|---|---|---|---|
| 4,227,770 A | 10/1980 | Gunn et al. | |
| 4,239,336 A * | 12/1980 | Parfree et al. | 385/101 |
| 4,272,155 A * | 6/1981 | Slaughter | 385/111 |
| 4,341,440 A | 7/1982 | Trezeguet et al. | |
| 4,408,828 A | 10/1983 | Le Noane et al. | |
| 4,422,718 A * | 12/1983 | Nakagome et al. | 385/113 |
| 4,491,386 A | 1/1985 | Negishi et al. | |
| 4,504,112 A * | 3/1985 | Gould et al. | 385/102 |
| 4,623,218 A | 11/1986 | Laurette et al. | |
| 4,647,151 A * | 3/1987 | Grogl et al. | 385/109 |
| 4,648,919 A | 3/1987 | Diaz et al. | |
| 4,678,274 A | 7/1987 | Fuller | |
| 4,690,497 A | 9/1987 | Occhini | |
| 4,826,278 A * | 5/1989 | Gartside et al. | 385/105 |
| 4,915,490 A | 4/1990 | Ramsay et al. | |
| 5,155,788 A * | 10/1992 | Chapin et al. | 385/104 |
| 5,222,178 A | 6/1993 | Betker et al. | |
| 5,371,825 A * | 12/1994 | Traut | 385/109 |
| 6,060,662 A | 5/2000 | Rafie | |
| 6,255,592 B1 | 7/2001 | Pennington | |
| 6,255,593 B1 | 7/2001 | Reede et al. | |
| 6,278,825 B1 | 8/2001 | Casiraghi et al. | |
| 6,392,151 B1 | 5/2002 | Rafie | |
| 6,404,961 B1 * | 6/2002 | Bonja et al. | 385/109 |

(Continued)

FOREIGN PATENT DOCUMENTS

EP 342855 A2 11/1989
EP 405851 A1 1/1991

(Continued)

*Primary Examiner* — Omar R Rojas
(74) *Attorney, Agent, or Firm* — Trevor Grove

(57) ABSTRACT

A cable component is provided that includes at least one optical fiber; and a two shaped profiles having inner and outer surfaces such that the inner surfaces combine to from an enclosure for the at least one optical fiber, wherein a first of the two shaped profiles has a cross sectional arc that is greater than a cross sectional arc of a second of the two shaped profiles.

15 Claims, 3 Drawing Sheets

(56) References Cited

U.S. PATENT DOCUMENTS

| | | | |
|---|---|---|---|
| 6,600,108 B1 * | 7/2003 | Mydur et al. | 174/120 R |
| 7,171,086 B2 * | 1/2007 | Engel | 385/100 |
| 2001/0020675 A1 | 9/2001 | Tubel | |
| 2001/0023614 A1 | 9/2001 | Tubel | |
| 2001/0040041 A1 | 11/2001 | Pennington | |
| 2002/0007948 A1 | 1/2002 | Bayne | |
| 2002/0085819 A1 | 7/2002 | Stottlemyer et al. | |

FOREIGN PATENT DOCUMENTS

| | | |
|---|---|---|
| FR | 2342508 A1 | 9/1977 |
| WO | 8604691 A1 | 8/1986 |

* cited by examiner

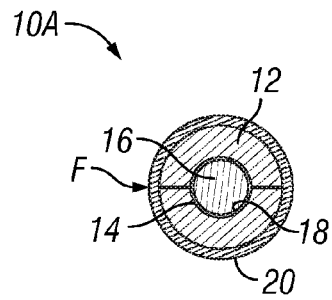 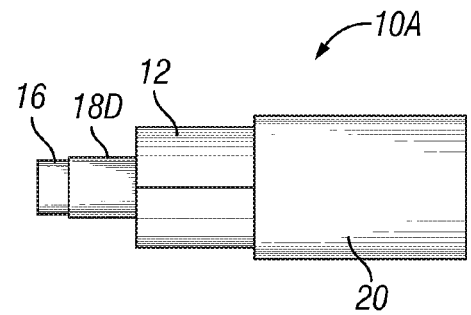
FIG. 1A  FIG. 1B
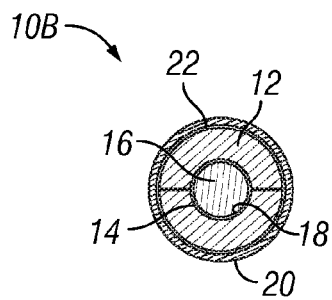 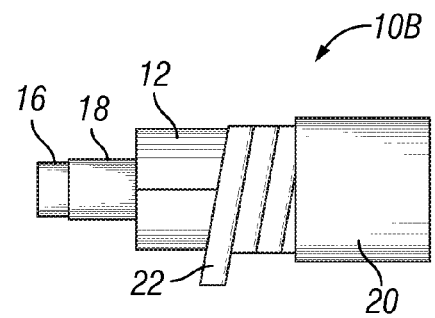
FIG. 2A  FIG. 2B
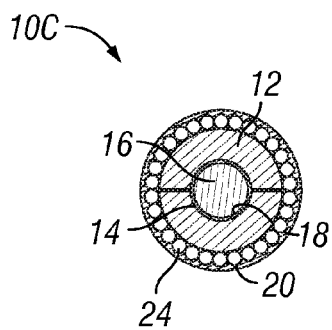 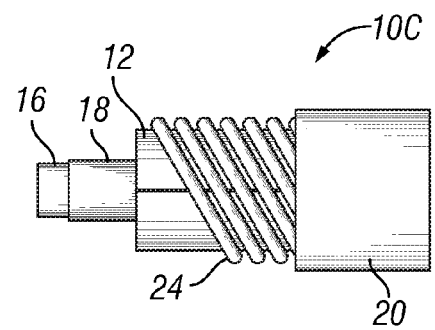
FIG. 3A  FIG. 3B

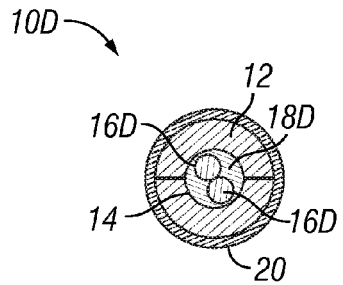
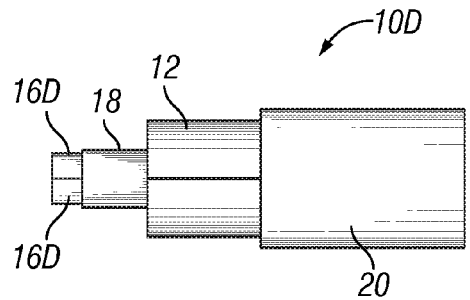
FIG. 4A  FIG. 4B
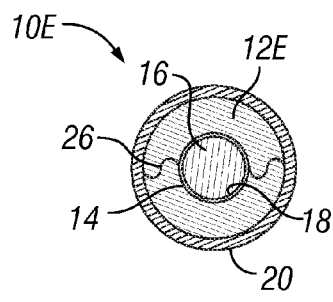
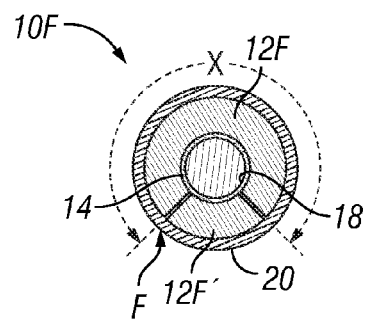
FIG. 5  FIG. 6

_US 9,201,207 B2_

PACKAGING FOR ENCASING AN OPTICAL FIBER IN A CABLE

CROSS REFERENCE TO RELATED APPLICATIONS

This application claims priority to and is a Continuation in Part of U.S. patent application Ser. No. 11/461,943, filed on Aug. 2, 2006, now abandoned which is incorporated herein by reference.

FIELD OF THE INVENTION

The present invention relates generally to a cable component having an optical fiber encased therein, and more particularly to such a cable component having a plurality of shaped profiles which combine to form an enclosure for an optical fiber.

BACKGROUND

In the oil and gas industry tools are often lowered in a subterranean wellbore by a cable (commonly referred to as a wireline or a wireline cable) for the purpose of monitoring or determining characteristics of the wellbore. Once data is collected by the tool, it is sent from within the wellbore to the surface of the wellbore through the cable. Recently, it has been discovered that optical fibers are able to transmit data from within a wellbore to the surface of a wellbore at a much faster rate than electrical data transmission lines. As such, it is desirable to include optical fibers in oil and gas wellbore wireline cables for the purpose of data transmission. However, several characteristics of optical fibers make them vulnerable to damage in oilfield operations.

For example, exposure to hydrogen at high temperatures results in a "darkening" of optical fibers, which leads to a reduction in data carrying capacity. The difference in linear stretching of optical fibers as compared to the other components of the cable requires additional fiber length to be built in to the optical fiber components, which complicates the manufacturing process. Volatilization of volatile organic compounds (VOCs) in coatings or other polymeric protective layers on the optical fibers releases additional hydrogen which can attack and darken the fibers. Optical fibers are susceptible to hydrolytic attack in the presence of water. A lack of transverse toughness of optical fiber component construction leads to potential point loading and micro-bending issues, which can lead to mechanical failure of the optical fibers and/or increased data attenuation.

One technique used to protect optical fibers from many of the problems listed above is to encase them in a solid metallic tube. However, encasing an optical fiber in a metallic tube has several disadvantages. For example, encasing an optical fiber in a metallic tube is very expensive. End to end welding of metallic tubes, which is necessary to create a wireline cable of a sufficient length, creates difficult-to-detect pinholes. Such welding also produces welding gases, which if trapped inside the tube can lead to deterioration of the optical fibers inside the tube.

In addition, when subjected to torque (which is present in most wireline cables) solid metallic tubes are prone to collapse unless they are excessively thick, as such the tube must be sufficiently thick to prevent collapse under such torque and/or other loads or pressures. However, such added thickness takes up valuable space within the cable core. Also, solid metallic tubes have limited flexibility, and a low fatigue life in dynamic applications; and optical fibers encased in metallic tubes cannot be spliced without over-sizing them. Accordingly, a need exists for an improved method and/or apparatus for encasing an optical fiber in a cable.

SUMMARY

In one embodiment, the present invention is a cable that includes at least one optical fiber; and a plurality of shaped profiles having inner and outer surfaces such that the inner surfaces combine to from an enclosure for the at least one optical fiber.

BRIEF DESCRIPTION OF THE DRAWINGS

These and other features and advantages of the present invention will be better understood by reference to the following detailed description when considered in conjunction with the accompanying drawings wherein:

FIG. 1A is a radial cross-sectional view of a cable component according to one embodiment of the present invention for encasing an optical fiber;

FIG. 1B is a longitudinal side view of the cable component of FIG. 1A;

FIG. 2A is a radial cross-sectional view of a cable component according to another embodiment of the present invention for encasing an optical fiber;

FIG. 2B is a longitudinal side view of the cable component of FIG. 2A;

FIG. 3A is a radial cross-sectional view of a cable component according to another embodiment of the present invention for encasing an optical fiber;

FIG. 3B is a longitudinal side view of the cable component of FIG. 3A;

FIG. 4A is a radial cross-sectional view of a cable component according to another embodiment of the present invention for encasing multiple optical fibers;

FIG. 4B is a longitudinal side view of the cable component of FIG. 4A;

FIG. 5 is a radial cross-sectional view of a cable component according to another embodiment of the present invention showing shaped profiles with mating ends for encasing an optical fiber;

FIG. 6 is a radial cross-sectional view of a cable component according to another embodiment of the present invention for encasing an optical fiber.

DETAILED DESCRIPTION OF EMBODIMENTS OF THE INVENTION

Figure 7:
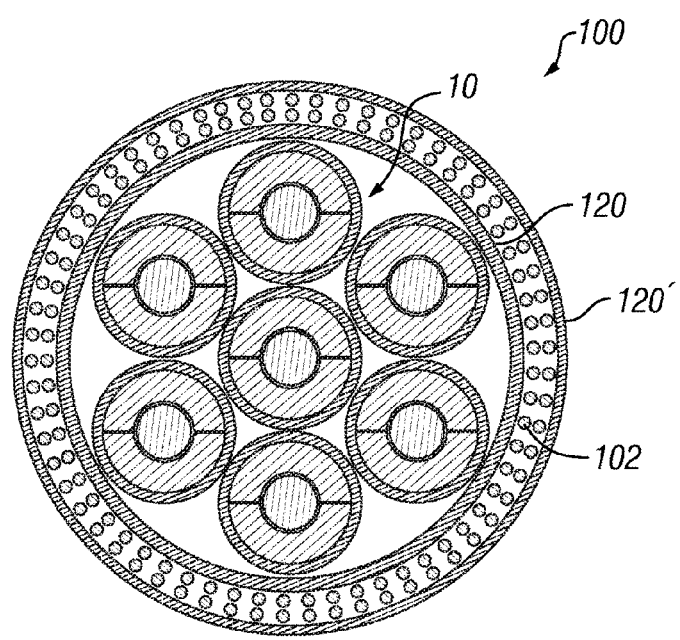
FIG. 7 shows a cable having a plurality of cable components according to the present invention disposed therein.

As shown in FIGS. 1-7, embodiments of the present invention are directed to a cable component having an optical fiber encased therein. In one embodiment, the cable includes a plurality of shaped profiles that are shaped and positioned such that in combination they form an enclosure for encasing an optical fiber therein. In one embodiment, the cable component forms a portion of a wireline cable for use in oil and gas wellbore applications. In such applications, the encased optical fiber may be used to transmit data from within a wellbore to a surface of the wellbore. In one embodiment the cable is approximately 10,000 to approximately 45,000 feet in length. Note that in showing and describing the various embodiments of the present invention, like or identical reference numerals are used to identify common or similar elements.

FIGS. 1A-1B show a cable component 10A according to one embodiment of the present invention. As described in further detail below, the cable component 10A of FIGS. 1A-1B, as well as any of the various alternative embodiments of FIGS. 2A-6, may be encased in a cable 100 as shown in FIG. 7. Referring back to FIGS. 1A-1B, the cable component 10A includes a plurality of shaped profiles 12, wherein a profile is defined as the shape of an object in cross section. The shaped profiles 12 are shaped and positioned relative to one another to combine to form an enclosure 14 for receiving an optical fiber 16. In the depicted embodiment, the inner surfaces of the shaped profiles 12 combine to form an enclosure 14, which is substantially circular.

In one embodiment, the shaped profiles 12 are formed by a cold forming process, such as a drawing process, an extrusion process, a rolling process, or any combination thereof, among other appropriate processes. These shaped profiles 12 may be composed of a conductive material, such as a metallic material, for example stainless steel, copper, steel or copper-clad steel, among other appropriate materials. These materials may be in the form of single or stranded wires. Alternatively, the shaped profiles 12 may be composed of any other appropriate material, such as a polymeric material. The shaped profiles 12 provide hoop strength to the cable component 10A. In addition, in embodiments where the shaped profiles 12 are composed of a conductive material, the shaped profiles 12 can be used as electrical conductors to send electrical signals, to transmit power, and/or to transmit data. This can be done in addition to the optical fiber 16 being used to transmit data/and or power.

Within the enclosure 14 formed by the shaped profiles 12 is the optical fiber 16. The optical fiber 16 may be any appropriate single or multi-mode optical fiber. Commercially available optical fibers 16 typically include an outer coating such as an acrylic coating, or silicon followed by a perfluoroalkoxy resin (PFA) coating. As such, unless otherwise specified, the term optical fiber includes this outer coating.

As shown in FIGS. 1A-1B, an insulation layer 18 may be placed about the optical fiber 16. To avoid duplicity, the layer 18 is referred to hereinafter as an insulation layer, however, layer 18 may be an insulation layer and/or a cushioning or space filling layer, such as a soft polymer layer. In one embodiment, the insulation layer 18 fills the area between the inner surfaces of the shaped profiles 12 and the outer surface of the optical fiber 16. The insulation layer 18 cushions the optical fiber 16 and protects it from damage by the inner surfaces of the shaped profiles 12. The insulation layer 18 may be composed of a soft thermoplastic material, a thermoplastic elastomer, a rubber material and/or a gel, among other appropriate materials. In one embodiment, the insulation layer 18 is composed of soft silicone or another soft polymer with similar properties.

Disposed about the outer surface of the shaped profiles 12 is an outer insulation layer 20. The outer insulation layer 20 holds the shaped profiles 12 together and improves the durability and manufacturability of the cable component 10A. In one embodiment, the shaped profiles 12 are "physically independent." That is, the shaped profiles 12 are separate parts that are not coupled, joined or bonded together, but instead are merely held together by the outer insulation layer 20.

In one embodiment, the outer insulation layer 20 is composed of a polymer having a reasonably high melting temperature such that it does not melt in the high temperature environments of typical oil and gas wells. For example, the outer insulation layer 20 may be composed of a polymeric material or a hard plastic material, for example polyetheretherketone (PEEK), or another fluoropolymer, for example Tefzel®, a perfluoroalkoxy resin (PFA), a fluorinated ethylene propylene copolymer (FEP), tetrafluoroethylene (TFE), perfluoromethylvinylether copolymer (MFA), or among other appropriate polymers and/or fluoropolymers. The insulation layer 20 may have more than one polymer disposed in such a way as to meet stacked di-electric concepts.

Although not shown, the cable component 10A may further include an outer metallic shell. This outer metallic shell may be an extruded metallic shell composed of lead, or an alloy such as tin-zinc, tin-gold, tin-lead, or tin-silver, among other appropriate materials. The metallic shell may be disposed over the outer insulation layer 20 or between the shaped profiles 12 and the outer insulation layer 20.

In one embodiment, the cable component 10A is manufactured by encasing the optical fiber 16 in an insulation layer 18; and placing multiple shaped profiles 12 around the optical fiber 16 and the insulation layer 18 to form an enclosure 14 around the optical fiber 16 and its insulation layer 18. The outer insulation layer 20, such as a layer of a hard plastic material, is then extruded over the shaped profiles 12 to hold or lock the shaped profiles 12 in place over the optical fiber 16.

In one embodiment, prior to placing the shaped profiles 12 about the optical fiber 16 and its insulation layer 18, the insulation layer 18 is in a liquid form such as an uncured silicone. In such a case, when the shaped profiles 12 are placed about the optical fiber 16 and its insulation layer 18, the liquid insulation layer 18 is allowed to fill the enclosure 14 in the area between the inner surfaces of the shaped profiles 12 and the outer surface of the optical fiber 16. The insulation layer 18 can then be hardened by curing to hold its shape between the shaped profiles 12 and the optical fiber 16.

FIGS. 2A-2B show a cable component 10B. The cable component 10B of FIGS. 2A-2B may include each of the components and various embodiments as described above with respect to the cable component 10A in FIGS. 1A-1B. However, the cable component 10B of FIGS. 2A-2B additionally includes a layer of tape 22 between the shaped profiles 12 and the outer insulation layer 20. In such an embodiment, the tape 22 is wrapped around the shaped profiles 12 to hold them together while the outer insulation layer 20, such as a layer of a hard plastic material, is extruded over the tape 22 and the shaped profiles 12. In such an embodiment, the cable component 10B may be wrapped around a spool after applying the tape 22 so that the cable component 10B can be moved to a separate production line to apply the extruded hard plastic jacket 20.

FIGS. 3A-3B show a cable component 10C. The cable component 10C of FIGS. 3A-3B may include each of the components and various embodiments as described above with respect to the cable component 10A in FIGS. 1A-1B. However, the cable component 10C of FIGS. 3A-3B additionally includes a layer of wrapped wire 24 between the shaped profiles 12 and the outer insulation layer 20. In such an embodiment, the wrapped wire 24 is cabled helically around the shaped profiles 12 at a helix angle to hold the shaped profiles 12 together and prevent them from radially moving while the outer insulation layer 20, such as a layer of a hard plastic material, is extruded over the wrapped wire 22 and the shaped profiles 12.

In one embodiment, the wrapped wire 24 is composed of a conductive material, such as a metal for example copper, copper-clad steel, or steel, among other appropriate materials. Alternatively, the wrapped wire 24 may be composed of any other appropriate material, such as a polymeric material or a twisted yarn. However, in embodiments where the wrapped wire 24 is composed of a conductive material, the wrapped wire 24 serves to minimize thermal expansion along the longitudinal axis of the cable component 10C and may serve as an electrical conductor capable of sending electrical signals, to transmitting power, and/or transmitting data. As with the cable component 10B of FIGS. 2A-2B, with the cable component 10C of FIGS. 3A-3B, the cable component 10C may be wrapped around a spool after applying the wrapped wire 24 so that the cable component 10C can be moved to a separate production line to apply the extruded hard plastic jacket 20.

Although each of the above cable components 10A-10C includes only one optical fiber 16, any of the cable components according to the present invention, including those described both above and below, may include any appropriate number of optical fibers 16. For example, FIGS. 4A-4B show a cable component 10D having two optical fibers 16D encased therein. As shown, in this embodiment the shaped profiles 12 combine to form an enclosure 14 that does not snuggly fit about the optical fibers 16D. In such an embodiment, an insulation layer 18D may be formed around the optical fibers 16D by any appropriate method to fill the area between the inner surfaces of the shaped profiles 12 and the outer surfaces of the optical fibers 16D.

For example, in one embodiment prior to placing the shaped profiles 12 about the optical fibers 16D and their insulation layer 18D, the insulation layer 18D is in a liquid form such as an uncured silicone. In such a case, when the shaped profiles 12 are placed about the optical fibers 16D and their insulation layer 18D, the liquid insulation layer 18D is allowed to fill the enclosure 14 in the area between the inner surfaces of the shaped profiles 12 and the outer surface of the optical fibers 16D. The insulation layer 18D can then be hardened by curing to hold its shape between the shaped profiles 12 and the optical fibers 16D. In this way, the insulation layer 18D occupies the entire space between the inner surfaces of the shaped profiles 12 and the outer surface of the optical fibers 16D. In all other respects the cable component 10D of FIGS. 4A-4B may include each of the components and various embodiments described above with respect to the cable components 10A-10C in FIGS. 1A-3B.

In each of the above described cable components 10A-10D, the shaped profiles 12 include two semi-circular shaped profiles which together form a hollow cylinder, with a circular shaped enclosure 14 for receiving one or more optical fibers 16. FIG. 5 shows a cable component 10E having two semi-circular shaped profiles 12E, wherein the ends of each shaped profile 12E have complementary surfaces 26 which mate to prevent the shaped profiles 12E from moving relative to one another in the radial direction. In all other respects the cable component 10E of FIG. 5 may include each of the components and various embodiments described above with respect to the cable components 10A-10D in FIGS. 1A-4B.

When a cable component according to any one of the above described embodiments is placed in a subterranean wellbore, the cable component often experiences radially inward directed forces. These forces may be caused by pressure changes within the wellbore, surrounding wellbore fluids, or other downhole wellbore tools, components or contours, among other possible means. When such radially inward forces occur at the juncture of adjacent shaped profiles, the force tends to separate the shaped profiles. For example, when a radially inward directed force F occurs at the junction of the two shaped profiles 12 of the cable component 10A of FIG. 1, the force F tends to separate the shaped profiles 12, causing damage to the underlying optical fiber 16.

Such a problem may be rectified by constructing the ends of each shaped profile with complementary surfaces which mate or interlock to prevent the shaped profiles from moving relative to one another when contacted by a radially inward directed force. FIG. 5 shows an example of such a configuration. However, the manufacture of such mating or interlocking surfaces can be complicated and expensive.

A cost effective and easily manufacturable solution to the described problems presented by radially inward directed forces is shown in FIG. 6. That is, FIG. 6 shows a cable component 10E having two shaped profiles 12F and 12F' similar to several of the embodiments described above. However, in the embodiment of FIG. 6, a first of the two shaped profiles, 12F, has a larger cross sectional arc X than that of a second of the two shaped profiles, 12F'.

For example, in one embodiment the cross sectional arc X of the first shaped profile 12F is an arc of approximately 210° and the cross sectional arc of the second shaped profile 12F' is correspondingly an arc of approximately 150°. However, in general the arc X of the first shaped profile 12F may be from about 210° to about 270° and the arc of second shaped profile 12F' may correspondingly be from about 150° to about 90°.

In addition, the juncture or interface between the shaped profiles 12F and 12F' is such that a radially inward directed force F does not tend to separate the shaped profiles 12F and 12F' but instead tends to wedge the shaped profiles 12F and 12F' together. Thus, the enclosure 14 provided by the shaped profiles 12F and 12F' is not disturbed or altered by radially inward directed forces F and the underlying optical fiber 16 is thus not harmed by radially inward directed forces F acting on the cable component 10F. In addition, in one embodiment the configuration of the shaped profiles 12F and 12F' in the cable component 10F of FIG. 6 does not include any mating or interlocking features at the interface of the shaped profiles 12F and 12F'. Thus, the manufacturability of the shaped profiles 12F and 12F' is increased and the cost of producing the cable component is decreased while still maintaining the advantages that a split tube has over a solid tube as described above in paragraphs 0005 and 0006.

In all other respects except for the shaped profile arc sizes, the cable component 10F of FIG. 6 may include any of the components of the various embodiments described above with respect to the cable components 10A-10E in FIGS. 1A-5.

FIG. 7 shows a cable 100 having a plurality of cable components 10 according to the present invention. Note that although the depicted cable 100 includes seven cable components 10, the cable 100 may include any appropriate number of cable components 10. Also note that the plurality of cable components 10 may include any combination of one or more of any of the cable components 10A-10F described above.

In addition, any of the cable components 10 may be replaced by an insulated conductor that does not include an optical fiber, such as an insulated copper wire. Such an insulated conductor may be used to send electrical signals, to transmit power, and/or to transmit data.

In one embodiment, the cable 100 is suitable for use in oil exploration such as a seismic cable, a wireline cable, a slickline cable, or a multi-line cable, amount other suitable cables. In the depicted embodiment, the cable components 10 are encased in a first insulation or jacket layer 120 and a second insulation or jacket layer 120'. Sandwiched between the insulation layers is a reinforcement layer 102. The reinforcement layer 102 may be composed of any material appropriate for adding strength to the cable, such as a metallic wire, which may be helically wrapped around the first insulation layer 120.

The first and second insulation layers 120,120' may be composed of any of the material described above with respect to the outer insulation layer 20 described in FIGS. 1A-1B ahead. In addition, the first and second insulation layers 120, 120' may be applied by any of the methods described above with respect to the outer insulation layer 20. Note that in some embodiments it may not be necessary to include the second insulation layer 120'.

Cables according to the invention may be used with wellbore devices to perform operations in wellbores, penetrating geologic formations that may contain gas and oil reserves. The cables may be used to interconnect well logging tools, such as gamma-ray emitters/receivers, caliper devices, resistivity measuring devices, seismic devices, neutron emitters/receivers, and the like, to one or more power supplies and data logging equipment outside the well. Cables of the invention may also be used in seismic operations, including subsea and subterranean seismic operations, the cables may also be useful as permanent monitoring cables for wellbores.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

The invention claimed is:

1. A method of manufacturing a cable, comprising:
   providing a plurality of cable components comprising:
   two shaped profiles forming an enclosure, wherein one of the two shaped profiles has an arc of from 210 degrees to 270 degrees and the other of the two shaped profiles has an arc of from 90 degrees to 150 degrees;
   an optical fiber located within the enclosure; and
   an outer insulation layer disposed about the cable component;
   encasing the plurality of cable components with a first jacket;
   placing at least one strength member about the first jacket; and
   placing a second jacket about the at least one strength member; and
   wrapping, in a helical pattern, a stabilizing layer about outer surfaces of the shaped profiles of at least one of the cable components.

2. The method of claim 1 wherein the cable components comprise at least one optical fiber.

3. The method of claim 1 wherein a first of the two shaped profiles has a cross sectional arc that is greater than a cross sectional arc of a second of the two shaped profiles.

4. The method of claim 1, wherein the shaped profiles comprise a metallic material.

5. The method of claim 1, wherein the shaped profiles form a non-stranded structure.

6. The method of claim 3, wherein the outer insulation layer is composed of a material that is one of a polymeric material and a hard plastic material.

7. The method of claim 6, wherein the shaped profiles are held together by the outer insulation layer and are not otherwise connected to each other on at least one pair of adjacent sides thereof.

8. The method of claim 1, wherein the stabilizing layer is electrically conductive.

9. The method of claim 6, further comprising providing a cushioning layer disposed about an outer surface of the at least one optical fiber.

10. The method of claim 9, wherein the cushioning layer at least substantially fills an area between the inner surfaces of the shaped profiles and the outer surface of the at least one optical fiber.

11. The method of claim 1, wherein the at least one cable component and the shaped profiles each extend substantially along the length of the cable component.

12. The method of claim 1, wherein the cable is a seismic cable, a wireline cable, a slickline cable or a multi-line cable.

13. The method of claim 1, wherein at least one of the components comprises a liquid polymer layer about an outer surface of the at least one optical fiber, such that the liquid polymer layer at least substantially fills an area between the inner surfaces of the shaped profiles and the outer surface of the at least one optical fiber.

14. The method of claim 13, wherein the liquid polymer layer is comprised of silicon.

15. The method of claim 1, wherein the cable a wireline cable for use in an oil and gas well.

\* \* \* \* \*